(12) United States Patent
Spalter

(10) Patent No.: US 9,434,283 B2
(45) Date of Patent: Sep. 6, 2016

(54) HEAD AND NECK SUPPORTING TRAVEL CUSHION

(71) Applicant: Amos Spalter, Miami, FL (US)

(72) Inventor: Amos Spalter, Miami, FL (US)

( * ) Notice: Subject to any disclaimer, the term of this patent is extended or adjusted under 35 U.S.C. 154(b) by 0 days.

(21) Appl. No.: 14/525,362

(22) Filed: Oct. 28, 2014

(65) Prior Publication Data

US 2016/0114708 A1    Apr. 28, 2016

(51) Int. Cl.
*B60N 2/48* (2006.01)
*A47G 9/10* (2006.01)
*A47C 7/38* (2006.01)

(52) U.S. Cl.
CPC .............. *B60N 2/4882* (2013.01); *A47C 7/383* (2013.01); *A47G 9/1081* (2013.01); *B60N 2/4879* (2013.01); *A47G 9/1027* (2013.01); *A47G 2009/1018* (2013.01)

(58) Field of Classification Search
CPC .. A47C 7/383; B60N 2/4879; B60N 2/4882; A47G 2009/1018; A47G 9/1036; A47G 9/1081; A47G 9/1027

USPC .......................................................... 297/397
See application file for complete search history.

(56) References Cited

U.S. PATENT DOCUMENTS

| 6,116,691 | A  | * | 9/2000 | Reece ........................... 297/392 |
| 7,331,631 | B1 | * | 2/2008 | Yeh ............................... 297/391 |
| 2013/0113262 | A1 | * | 5/2013 | Nam .............................. 297/397 |
| 2013/0278027 | A1 | * | 10/2013 | Brucato ................... 297/216.12 |

* cited by examiner

*Primary Examiner* — Milton Nelson, Jr.

(57) ABSTRACT

A cushion optionally includes an interface for support on a surface and a head supporting section and a neck positioning section. The head support may include a U-shaped outwardly bowed ledge for supporting an occipital bone and/or a temporal bone. The head support may include a wall for blocking lateral movement of a temple. For example the pillow may be ready to use without reshaping by a user, for example having a substantially fixed shaped. The pillow may supply superior support and/or anterior support to a head and/or support the head from rotating forward and/or laterally.

23 Claims, 10 Drawing Sheets

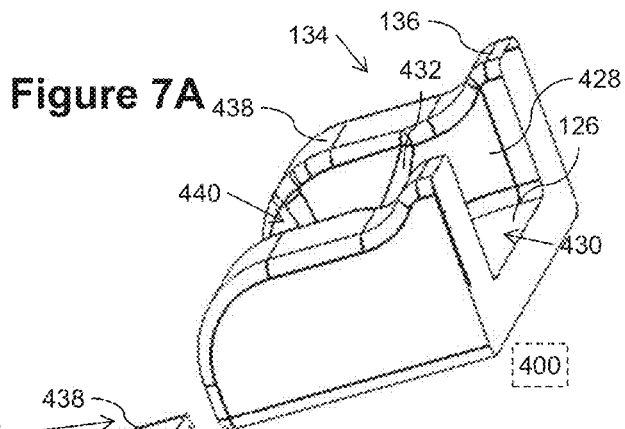
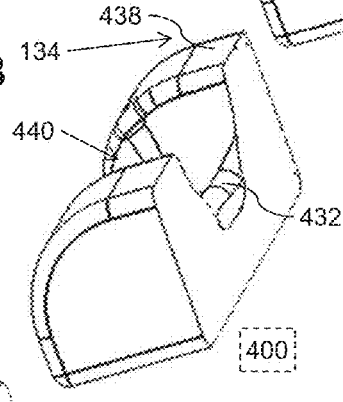
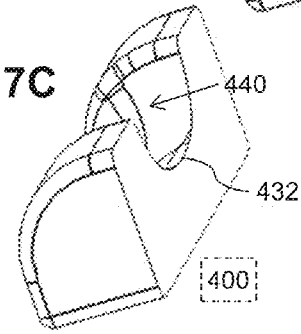
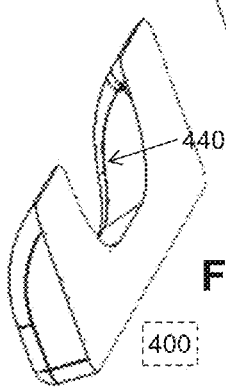

HEAD AND NECK SUPPORTING TRAVEL CUSHION

FIELD AND BACKGROUND OF THE INVENTION

The present invention, in some embodiments thereof, relates to a cushion and, more particularly, but not exclusively, to a travel pillow for use on vehicle seats (for example airplanes) during long trips.

U.S. Pat. No. 7,644,990 to Pearson apparently discloses, "a personal support apparatus for supporting the head and body of a person sleeping in a seated position," that, "includes a generally U-shaped collar member for contacting the wearer's neck from the back, with the collar being made from a soft resilient material that retains its shape, and first and second side arm support members permanently or reversibly and adjustably attached to the collar, with the side arm support members being made from a soft malleable material that reversibly conforms to the contours of the passenger's body and/or the vehicle seat or other surface, the first and second side arm support members being characterized by a first level of firmness, and the collar member being characterized by a second level of firmness that is greater than the first level of firmness".

U.S. Pat. No. 8,584,285 to Sipherd apparently discloses, "a travel pillow that provides head cushioning, lateral support and stays in place when the user is in a seated position or semi-reclined. The travel pillow including a neck support cradle, head base contour to provide vertical head support, head support platform, side buttresses to provide lateral head support and support bases to achieve an anatomically neutral position for the cervical spine."

U.S. Published Patent Application No. 2011/0094035 to Tansingco apparently discloses, "A travel pillow for providing the head and neck alignment of a human user resting against a seat back. The travel pillow has an interior shell of a semi-stiff unitary construction. There is a head support region defining a head supporting space for supporting the user's head, a neck support region defining a neck supporting space for supporting the user's neck posteriorly, an enlarged portion bridging together the head support region and the neck support region, the enlarged portion varying in radius from the head support region to the neck support region all elements functioning together as a single unit to maintain the columnar alignment of the user's head directly above the user's neck, and lobes extending upwardly on either side of the head support region to support the head at the intersection of the occipital bone, parietal bone and temporal bones on either side of the head to prevent lateral bending of the neck. The pillow is placed between the user and the seat back, wherein the pillow is held in place during use by the user's weight resting against the seat back. The head support region may be sized and shaped to match the approximate shape of the back of the user's head. The head support region may be transversely curved about the user's vertebral axis and is cut away at the user's occiput such that the user's head rests directly against the seat headrest."

U.S. Pat. No. 4,285,081 to Price apparently discloses, "A portable device for recumbency of the head and neck providing support for the same while travelling or in other situations where discomfort arises from lack of adequate support. The device is provided with a surface having a generally concave shape with respect to a vertical axis of curvature corresponding approximately to the central vertebral axis of the neck. The concave shape is fashioned so that it has symmetrical left and right halves, opposing areas of which are designed to exert gentle pressure in the vicinity of the mastoid processes of the head, a region near the base of the head, and located at the sides thereof almost at the rear. There are two embodiments of the device, one a padded resilient sheet curved to provide the support surface and a second in the form of an inflatable pillow."

U.S. Pat. No. 5,220,700 to Liu apparently discloses, "A protective pillow," comprising, "two symmetrical side panels connected by a back panel which define a receiving space therein for the comfortable support of the head of a user. The back panel has an orthopedically engineered front surface which closely fits the back of the head. The side panels have bottom ends which terminate into hooks by which the pillow can be fastened or attached to the user's shoulders."

Additional background art includes U.S. Pat. No. 4,031,578 to Sweeney et al., U.S. Pat. No. 5,457,832 to Tatum, U.S. Pat. No. 5,630,651 to Fishbane, U.S. Pat. No. 5,813,065 to Tinhorn, U.S. Pat. No. 7,908,692 to Lange, U.S. Pat. No. D619,402 to Stemlight et al.; U.S. Pat. No. D404,238 to Keilhauer.

SUMMARY OF THE INVENTION

According to an aspect of some embodiments of the present invention there is provided a travel cushion comprising: an interface fitting to an airplane seat back to be supported thereon; an anterior surface having a preuse configuration including a head indentation having an open anterior facing rear face, side surfaces and a upwardly curved base, the curved base shaped to at least partially wrap around an occipital portion of a head of a user; a ledge along the curved base of the head indentation for providing superior support to the occipital portion of the head of the user, the ledge bowing upward (in a superior direction) and outward (in an anterior direction) from the open face; a neck positioning cradle having and open face, and a rear surface inclining toward a posterior direction from a superior end, the superior end joined to the head indentation along the ledge.

According to some embodiments of the invention, the cushion is elastic, spontaneously returning to the preuse configuration in the absence of an external stress.

According to some embodiments of the invention, the side surfaces of the head indentation include a temple prop, obstructing lateral movement of a temple of a user.

According to some embodiments of the invention, the side surfaces of the head indentation include an ear opening.

According to some embodiments of the invention, the side surfaces of the head indentation protrude to a non-uniform extent from a hindermost point of the rear surface of the head indentation including an ear opening section located between 2 and 8.5 cm superior to an inferior point on the ledge and protruding less than 84 mm anterior to the hindermost point of the rear surface of the head indentation and a temple prop section located superior to the ear opening and protruding further in the anterior direction than the ear opening.

According to some embodiments of the invention, the neck positioning cradle is trapezoidal.

According to some embodiments of the invention, an upper surface of the ledge is at an angle between 65° and 95° to a longitudinal axis.

According to some embodiments of the invention, the ledge has a breadth of between 1.0 and 3.0 cm.

According to some embodiments of the invention, a breadth of the ledge varies along the horizontal axis of the cushion, the breadth increasing towards the sides of the cushion and decreasing towards the center of the cushion.

According to some embodiments of the invention, the travel cushion further includes a cushion behind the rear surface of the head section.

According to an aspect of some embodiments of the present invention there is provided a method for supporting a head and a neck joined thereto on a seat back inclined an angle W between 105 and 115 degrees from a horizontal x-axis and parallel to a horizontal z-axis comprising: supporting an occipital portion of the head in a superior direction; supporting two temples of the head, preventing the head from falling laterally; and providing ventilation to two ears of the head.

According to some embodiments of the invention, the method further includes supporting a back of the head in an anterior direction and wherein a net upward force on the head from the supporting the back of the head and the supporting the occipital portion is at least 90% of the weight of the head and wherein a sum of moments of the supporting in a superior direction and a force of gravity produce a rotational moment backwards.

According to some embodiments of the invention, the method further includes supporting an anterior part of the occipital portion.

According to some embodiments of the invention, the method further includes position a neck with respect to the head.

According to some embodiments of the invention, the method further includes position the neck with respect to the seat.

According to an aspect of some embodiments of the present invention there is provided a travel cushion comprising: a head support having a rear face, side surfaces, and an upwardly concave base; a neck cradle having and open face, and a rear surface inclining toward a posterior direction from a superior end joined to the upwardly concave base; and an occipital support ledge along a junction between the neck cradle and the head support, the occipital support ledge separating a shallow superior section of the neck cradle from a deeper base of the head support, and the occipital support ledge bowing upward and outward to be concave in the superior and anterior directions.

According to some embodiments of the invention, the occipital support ledge has a superior surface at an angle between 65° and 95° to a longitudinal axis.

According to some embodiments of the invention, the occipital support ledge has a breadth of between 1.0 and 3.0 cm.

According to some embodiments of the invention, the travel cushion further includes an interface configured for placement of an airplane seat at an angle of between 105 and 115 degrees from a horizontal x-axis.

According to some embodiments of the invention, the neck cradle is trapezoidal.

According to some embodiments of the invention, the occipital support ledge supports a temporal bone.

According to some embodiments of the invention, the occipital support ledge gives vertical support to a head from two sides thereof.

According to some embodiments of the invention wherein, in use, the form of the travel cushion is substantially fixed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-D are perspective cross sectional views of a cushion in accordance with an embodiment of the present invention;

DESCRIPTION OF SPECIFIC EMBODIMENTS OF THE INVENTION

Figure 1:
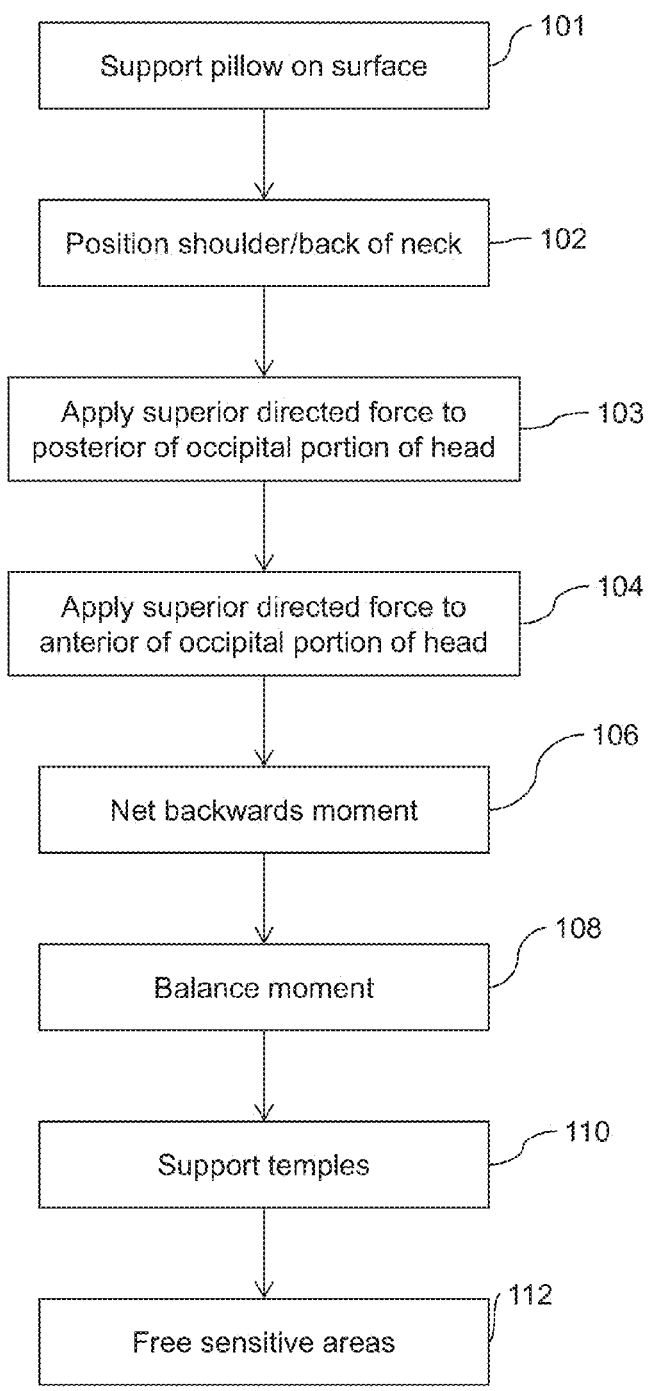
FIG. 1 is a flow chart illustrating a method of supporting a head in accordance with an embodiment of the present invention.

The present invention, in some embodiments thereof, relates to a cushion and, more particularly, but not exclusively, to a travel pillow for use on vehicle seats (for example airplanes) during long trips.

Overview

Integrated Head Support

An aspect of some embodiments of the present invention relates to a cushion giving support to the weight of a head in the superior direction and/or anterior direction with control of twisting moments on the head in the forward direction and/or the lateral direction. The balance of forces on the cushion optionally reduces linear and/or rotation stresses on the neck. For example, the net forces of the pillow may support a portion of the weight of the neck ranging between 95% to 100% and/or between 85% to 95% and/or between 50% to 85%. For example, the pillow may include a superior directed surface (for example a ledge) for applying superior directed forces to the head. Optionally, the forces may be distributed and/or balanced to control twisting moments on the head. For example superior forces on the head may be distributed along the anterior-posterior direction and/or anterior directed forces may be distributed along the superior-inferior direction to avoid forward rolling of the head. For example superior forces on the head may be distributed along the right-left direction and/or anterior directed forces may be distributed along the right-left direction to avoid sideward tilting of the head. The cushion is optionally configured to be supported on a chair back.

In some embodiments, superior directed support may be applied to an occipital portion of the head. For example, superior directed forces may be applied by a ledge wrapped around at least part of the occipital portion of the head. For example, the occipital portion of the head may include an inferior portion of the temporal bone and/or a posterior portion of the temporal bone and/or an anterior portion of the occipital bone and/or a posterior portion of the occipital bone. Optionally the superior directed and anterior directed forces are balanced to control forward or backward twisting moments on the head. Additionally or alternatively, the cushion may supply lateral support for the head, for example balancing lateral twisting moments and/or obstructing lateral movements of a portion of the head for example a temple. In some embodiments, the cushion may be supported on a seat and/or on the ground and/or in a reclining angle and/or at a supine angle. Optionally, the cushion provides a neck positioning cradle to position and/or to support and/or to orient the neck for proper support of the head. Optionally, the cushion provides a side wall to further control lateral twisting of the head. For example the side wall may obstruct lateral movement of a temple region of the head.

Structure for Integrated Cushion

An aspect of some embodiments of the present invention relates to a structure for a cushion supplying support to the weight of a head in the superior direction and/or anterior direction integrated with control of twisting moments. The anterior side of the cushion may include a head indentation and/or a neck positioner, for example a neck cradle. The neck cradle optionally positions and/or supports the neck and/or shoulders with respect to the head (located, for example, in the indentation). The head indentation optionally includes a ledge supporting the head by applying a superior force to an occipital portion of the head. The superior forces may combine with the force of gravity to create a net backward moment on the head. Additionally or alternatively the head indentation may included a anterior facing rear face supplying an anterior directed force to the back of the head balancing the above mentioned backward moment and/or balancing a posterior force on the head (for example including a posterior directed portion of a gravitational force). Additionally or alternatively the head indentation may include a side surface that limits lateral rotation of the head, for example by applying lateral force and/or blocking lateral movement of a temple of the user. Optionally, the cushion includes a ready for use, preuse configuration wherein the cushion and/or the ledge have a substantially fixed shape. In some embodiments, a cushion may include a posterior base for supporting on a chair.

In some embodiments of the present invention, a cushion may support the back of the head and/or the neck in a reclining and/or supine position. For example the head support of the cushion may have a padded back that may apply a force in an anterior direction on the back of the head. Alternatively or additionally, the shape of the neck positioner may be intended to even forces on the upper part of the spine.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Embodiments

Method of Supporting Neck and Head

Referring now to the figures, FIG. 1 is a flow chart illustrating a method of integrated supporting a head and neck in accordance with an embodiment of the present invention. Optionally, the support will position and/or align the head and/or neck such that the head and/or neck are held in a comfortable position. Optionally the head and/or neck are positioned with respect to a surface, for example a chair back. Optionally the weight of the head is supported by a cushion. Optionally, the head is maintained in a steady position without rolling.

In some embodiments a cushion may be supported 101 on a surface. For example a travel cushion may have a posterior side formed to fit a seat (for example an airlines seat). Optionally, the cushion may be fixed to the surface, for example with a seat belt and/or a strap and/or a hook and loop fastener (for example Velcro®). Alternatively or additionally, a cushion may be placed on the ground and/or on another convenient surface.

In some embodiments, as a person reclines, his shoulders and/or neck will be positioned 102 and/or supported with respect to a cushion. Positioning the head and/or neck with respect the cushion optionally also positions the head and/or neck with respect to the surface on which the cushion is supported. In some embodiments, the proper positioning of the neck and/or shoulders may position the head for proper support by the cushion and/or align the head, neck and/or shoulders with respect to each other. Optionally support may be supplied for the upper back and/or neck in the lateral, anterior and/or superior directions. The cushion may include a support and/or indentation for the shoulders and/or a support for the neck from the back and/or sides.

In some embodiments, as a person reclines into the cushion, the cushion will apply 103 a force in the superior direction to an anterior part of an occipital portion of the users head (for example to the anterior portion of the occipital bone and/or to the temporal bone and/or to the temporal process). Alternatively or additionally a superior directed force may be applied 104 to a posterior part of the occipital portion of the head, for example an anterior portion of the occipital bone.

In some embodiments, the positioning 102 of the head with respect to the neck and/or shoulders (for example a slight elevation of the neck and/or shoulders) and/or the application 103 of the superior directed force in a location towards the anterior of the head may lead to a net backwards moment 106 on the head (pushing the upper and/or back of the head towards the cushion). The net backward moment is optionally balanced 108 by anterior direction force on the back of the head and/or a superior directed force applied 104 on the posterior portion of the occipital bone. Potentially, the resulting balance of forces leads to balancing the forces of gravity on the head by forces from the cushion in the anterior and/or superior directions and to a stable positioning of the head due to balance of the moment in the forward and backwards directions.

In some embodiments, support 110 will be supplied to prevent the head from twisting sideways. For example, support 110 may be supplied by a side wall that limits lateral movement of the temples. Optionally, sensitive areas, for example the ears, will be ventilated and/or free 112, while the head is being supported.

Cushion

Figure 2:
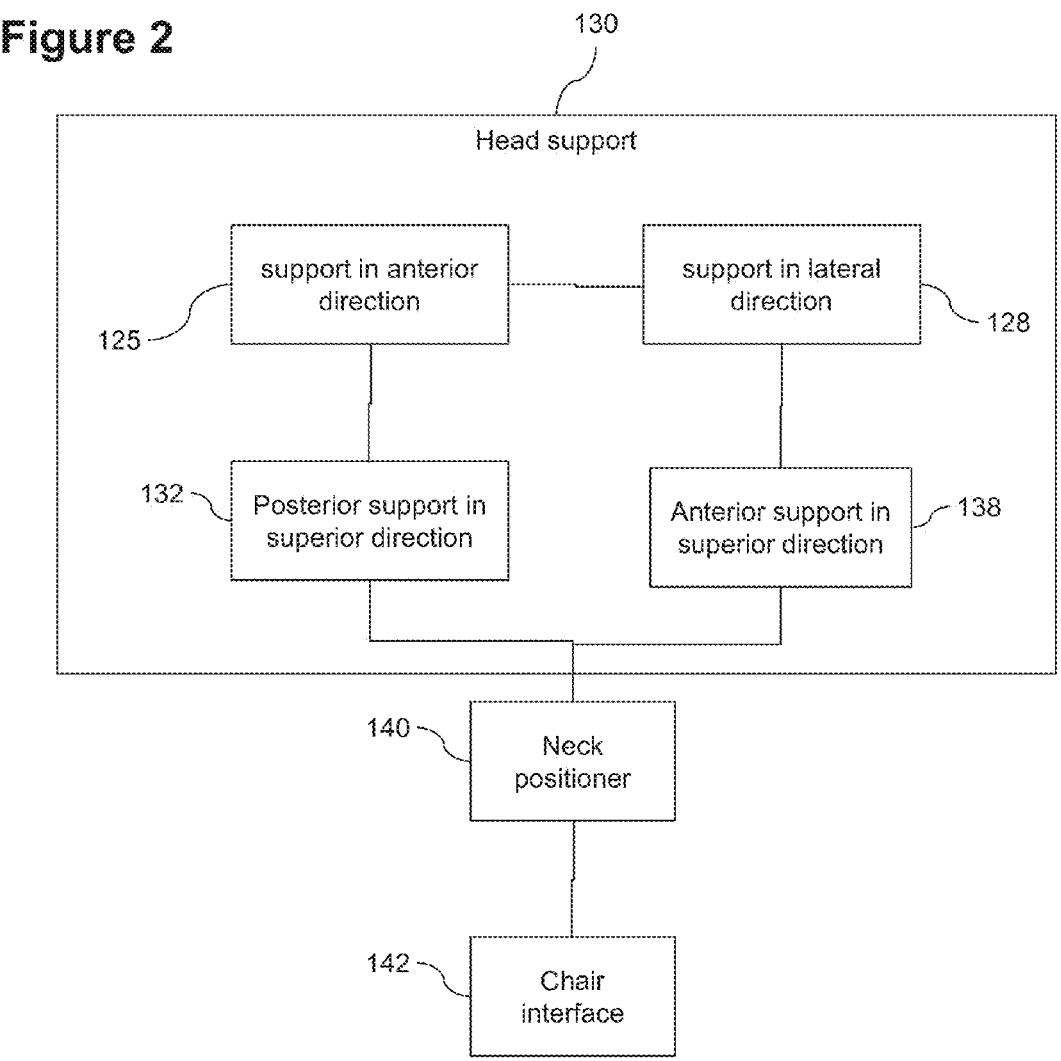
FIG. 2 is a block diagram of a cushion in accordance with an embodiment of the present invention.

FIG. 2 is a schematic block illustration of a head cushion in accordance with an embodiment of the present invention. Optionally the cushion includes supports for the head and/or neck in an integrated fashion and/or aligns the head and neck. The integrated support may be formed to produce a net backward moment on the head and/or neck. The cushion is optionally supported on and/or fixed in relation to a surface (for example vehicle seat).

In some embodiments, the cushion may include an interface 142 for a support surface. For example interface 142 may include a posterior surface of the cushion. The posterior surface may be flat and/or formed to fit a surface. For example, the posterior surface of the pillow may be sized to fit an airplane seat. For example the width of the posterior surface may range between 180 to 250 mm and/or between 250 to 300 mm and/or between 300 to 340 mm and/or greater than 340 mm. For example the length of the posterior surface may range between 180 to 220 mm and/or between 220 to 260 mm and/or between 260 to 300 mm and/or between 300 to 400 mm and/or greater than 400 mm.

In some embodiments the cushion may include neck positioner 140. The neck positioner may align the neck with the supporting surface and/or the head and/or shoulders. Alternatively or additionally, the neck positioner may distance the neck and/or shoulders from the supporting surface.

In some embodiments, the neck positioned may include a shoulder positioner. For example, should positioner may raise the shoulder s off the supporting surface. Optionally, raising the shoulders off the supporting surface may determine the position of the head and/or neck. For example, the shoulders may be raised from the surface further than the head and/or neck causing the head to roll backwards more than on the bare surface. Alternatively or additionally, the shoulders may be raised from the surface to the same distance as the head and/or neck causing the head to be on the same angle as the bare surface. Alternatively or additionally, the shoulders may be raised from the surface to a distance less than the head and/or neck causing the head to be on the angled slightly forward in comparison to the bare surface. Alternatively or additionally, the height of the shoulders may be adjusted independently from the neck and/or head. For example the shoulder support may include an inflatable chamber that is separate from the head support 130 and/or neck positioner 140.

In some embodiments, a cushion may include a head support. For example, head support 130 may include a head indentation into which a user places his head as he reclines. Optionally, head support 130 includes a posterior support 132 in the superior direction. For example posterior support 132 may produce a force in the superior direction on the lower posterior portion of the occipital bone. Optionally head support 130 includes an anterior support 138 in the superior direction. For example anterior support 138 may produce a force in the superior direction on an anterior portion of the occipital bone and/or on a temporal bone and/or a mastoid process. Optionally head support 130 includes a support 125 in the anterior direction. For example anterior directional support 125 may be applied at the back of the head. Optionally head support 130 includes support 128 in the lateral direction. For example lateral support 128 may include configuring the superior directed supports 132 and/or 138 to inhibit lateral rotation of the head. For example lateral portions of the superior directed supports 132 and/or 138 may be made to resist lateral rotation of the head.

For example the right and left sides of superior directed supports 132 and/or 138 may be made of springy material and/or independent inflated cushions that increases force as they are compressed. For example rotating the head laterally (for example to the right about the sagittal axis) will compress the a right superior support and/or release a left superior support resulting an in increased superior force on the right side and/or decreased superior force on the left side thereby producing a leftward moment and resisting further rightward rotation. Alternatively or additionally, a side wall may obstruct movement of and/or produce a lateral force against a temple and/or a temporal bone and/or against a parietal bone resisting lateral movement and/or laterally rotation of the head.

In some embodiments, a cushion may include a space for a sensitive area of the head. For example a sensitive area may include an ear. For example giving space to an ear may avoid pressure on the ear and/or may supply ventilation to an ear.

Figure 3A:
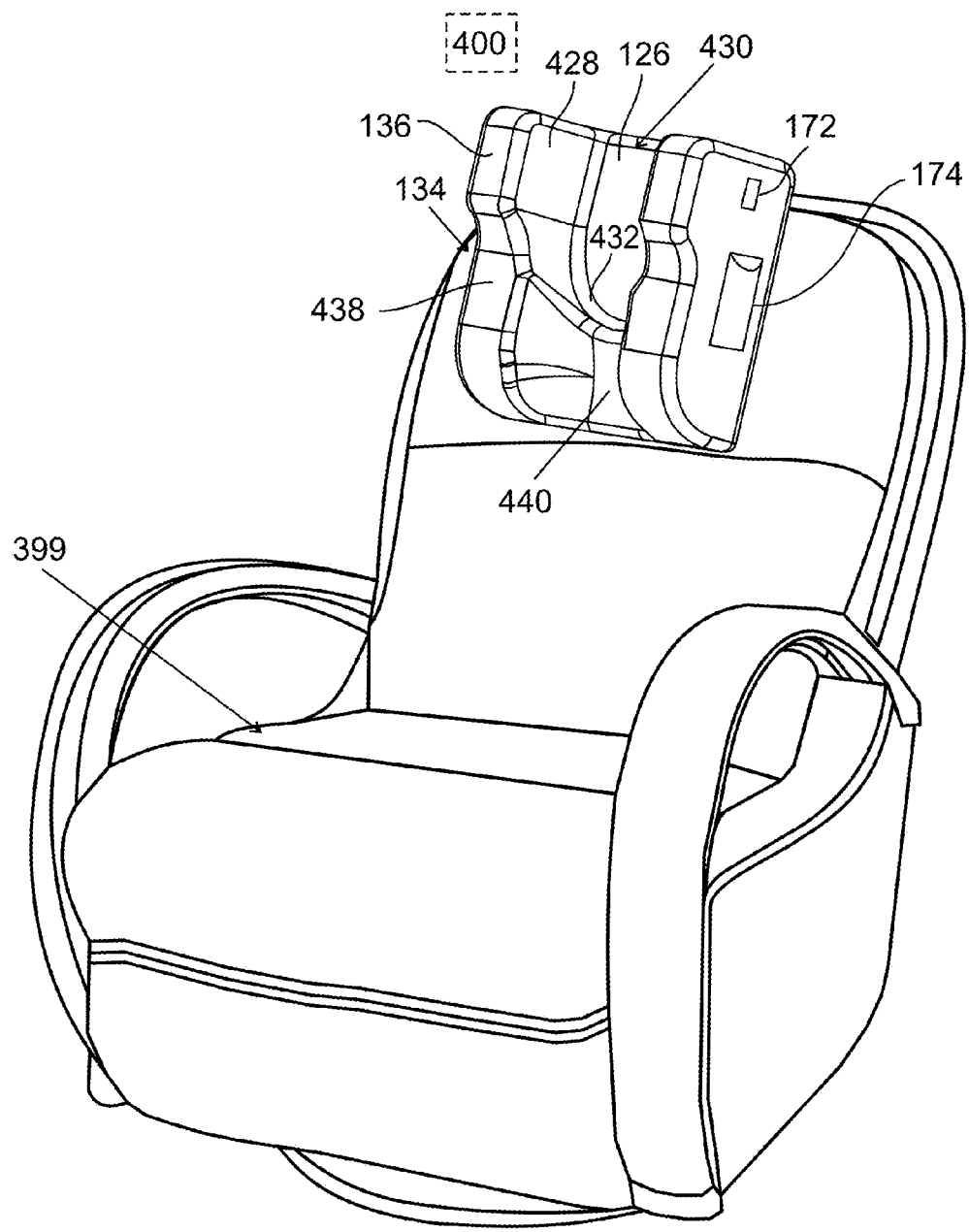
FIG. 3A is a perspective view of a cushion supported on a chair in accordance with an embodiment of the present invention.

FIG. 3A illustrates cushion 400 supported on a chair 399 in accordance with an embodiment of the present invention. In FIG. 3A, cushion 400 is shown supported on a back of chair 399. Optionally a cushion may be connected to a chair by a strap and/or a hood and loop fastener and/or a hook over the top of the chair and/or by another fastener. Alternatively or additionally, a cushion may extend to a seat of a chair and/or be supported by the seat. Alternatively or additionally a cushion may be formed to fit a chair back and/or be supported on the chair back by gravity and/or friction. Alternatively or additionally a cushion may be partially supported by the body of a user. For example the cushion may rest of the shoulders of the user and/or the weight of the user leaning on the cushion may increase friction with the chair back. Alternatively or additionally the cushion may be supported on the arms of the chair. Optionally detailed parts of an exemplary embodiment of a cushion 400 are described herein below, for example in FIG. 4.

Figure 3B:
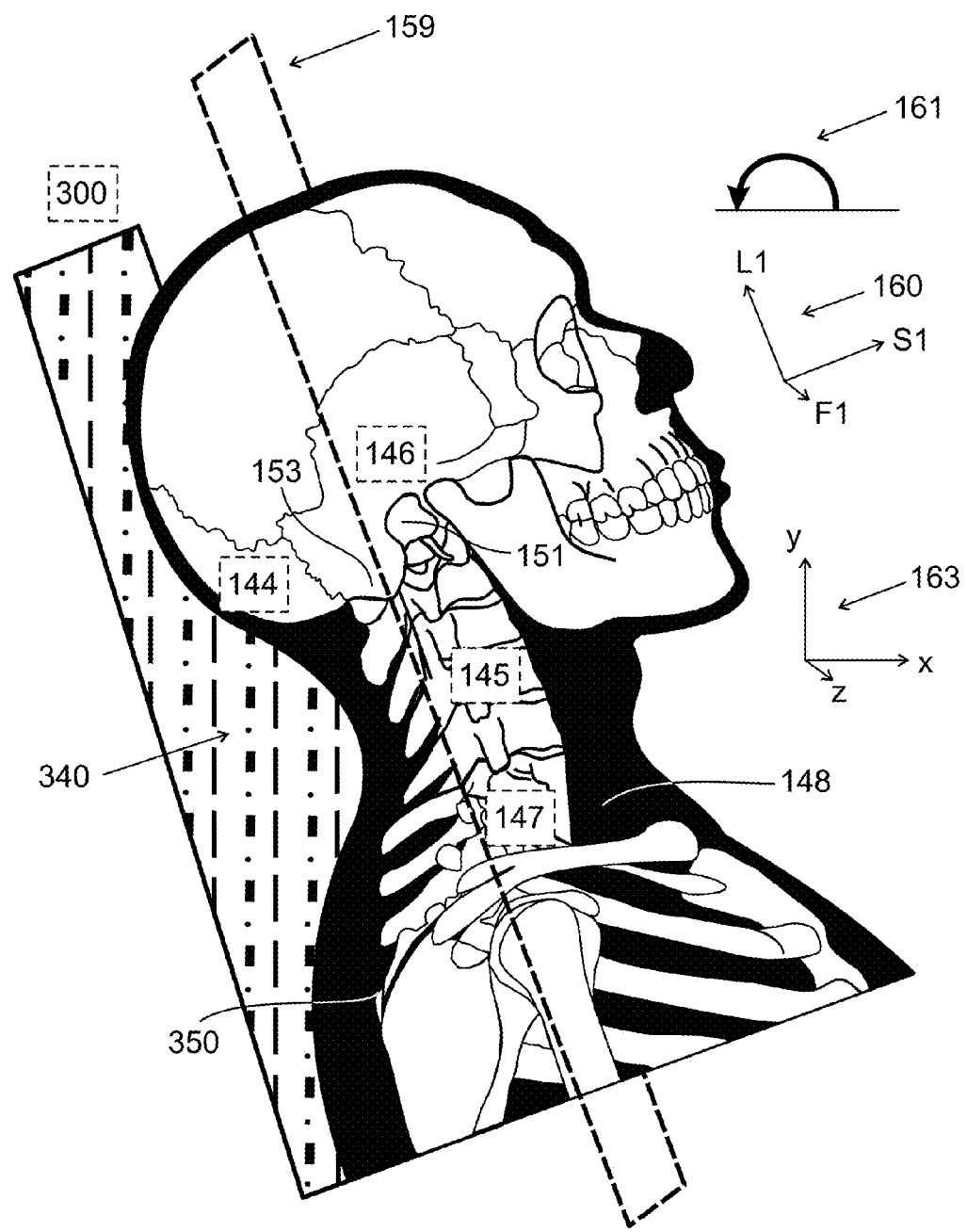
FIG. 3B is a side cross sectional view of a person reclining on a cushion in accordance with an embodiment of the present invention.

FIG. 3B is a side cross sectional view of a person reclining on a cushion in accordance with an embodiment of the present invention. A cushion 300 may be fit to the back of the head and/or neck 148 and/or shoulders. For example a neck section 340 may form a bulge fitting the cervical portion 145 of a spine and/or sloping at a shallow angle where the cervical portion 145 of the spine meets the thoracic portion 147 of the spine and/or shoulders. Optionally the cushion may include a shoulder support 350.

A set of anatomical axes 160 includes a longitudinal (superior-posterior) axis L1 and/or a frontal (left-right/lateral) axis F1 and/or a sagittal (anterior-posterior) axis S1. Rearward rotation 161 of an object around an axis parallel to the frontal axis may be defined for example as illustrated by the curved arrow where to top (superior) of the object moves backwards (in the posterior direction) and the bottom of the head moves forward (in the anterior direction). Forward rotation may be defined for example as rotation in the opposite sense to rearward rotation. A frontal plane 159 may be defined for example as a plane including and/or parallel to the longitudinal L1 axis and/or frontal F1 axis. A standard set geometric axes 163 (vertical y-axis, horizontal x-axis [which is perpendicular to the frontal axis F1] and horizontal z-axis [which is parallel to the frontal axis F1]) is illustrated.

FIG. 3B illustrates the temporal bone 146, the occipital bone 144 the mastoid process 153, and an acoustic meatus 151.

Exemplary Details of Cushion

Figure 4:
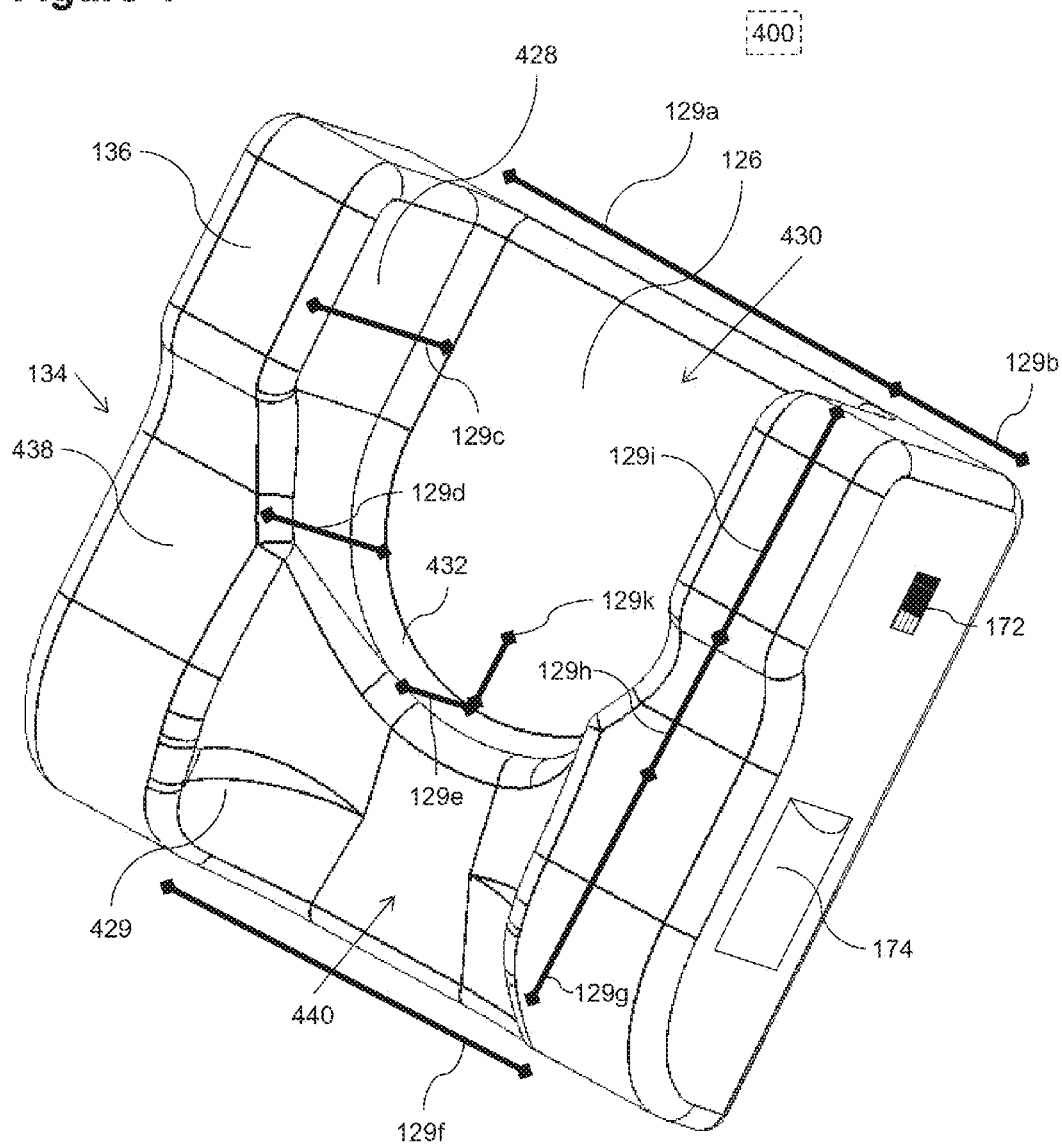
FIG. 4 is a front perspective view of a cushion in accordance with an embodiment of the present invention.

FIG. 4 is a perspective illustration of the face (anterior surface) of a cushion 400 in accordance with an embodiment of the present invention. For example, in an unstressed state (where there are no significant external forces on the cushion 400 and/or no one is leaning on cushion 400) cushion 400 optionally has a fixed preuse configuration. For example, cushion 400 may be made of an elastic material that returns to the preuse configuration when external stresses are removed and/or when the pillow is prepared for use (for example by inflation). In the preuse state the relative orientation and location of the various parts of the pillow remain approximately the same. In some embodiments, the cushion is stiff enough to approximately keep the same preuse configuration during use. Alternatively or additionally, the shape of a cushion may change significantly when external forces (for example the weight of a head) are applied. For example, cushion 400 may be made of sculpted block of soft foam covered by a cloth cover. Optionally the fixed shaped of cushion 400 means that a user does not need to reshape the pillow before use. For example, the user places the pillow on a seat and reclines onto the pillow which is immediately ready for use. Alternatively or additionally, the cushion may be inflatable. An inflatable cushion may have a fixed shape when inflated to a sufficient pressure. Alternatively or additionally, a cushion may have a stuffing and/or a combination of materials for fixed form and/or soft and/or reformable portions.

In some embodiments, a cushion may have an open face. For example, pillow 400 has an open anterior face including a head indentation 430 and/or a neck positioner, for example neck positioning cradle 440.

In some embodiments, head indentation 430 has a U-shape. For example, in cushion 400, the U-shape is defined at the bottom (inferior end) by a bowed ledge 432. Ledge 432 optionally has a U-shaped upwards (in the lateral and superior direction) and bows outwards (in the anterior direction). Head indentation 430 optionally includes an anterior facing rear face 126. For example, face 126 may be flat and/or soft and/or it may be sculpted to fit the shape of a user's head. The upper (superior) end of head indentation 430 is optionally open. The upper sides of head indentation 430 are optionally defined by side walls 428. Side walls may optionally be taller in an upper temple region 136 than in a lower ear space 134 region. For example the lowered side wall 428 of ear space 134 region may leave a space 134 for ventilation and/or to avoid pressure against an ear of the user.

In some embodiments, neck cradle 440, may be in the form of a trapezoidal indentation with rounded side walls 429. Optionally, neck cradle 440 is open at the bottom (inferior end) and/or bounded on its upper (superior) end by the U-shaped ledge of head indentation. Moving from the inferior opening to the superior connection with head indentation, neck cradle optionally slopes outward (an optional form the cross section of neck cradle 440 is illustrated in more detail in FIG. 7D herein below).

In some embodiments cushion 440 may include a cloth cover that may include various accessories. For example, the cover may include a pocket 174 that may be used for example for a telephone and/or an MP3 player and/or glasses. Optionally a pocket may be placed on a protected location, for example side walls 428 and/or the posterior surface of the pillow. For example, a protected location may be chosen to make it harder to steal the object when a user is sleeping on the pillow. The cover may optionally include a clip 172 for example a strap and/or an elastic and/or a hook. For example a clip may hold an earphone wire so that when the user gets up the earphones stay connected to the pillow. Optionally, a clip may be located on the superior (top) side of the cushion and/or on an anterior face of the cushion, for example on the anterior face of raised temple region 136 and/or transition region 438. Optionally, a clip 172 may be included on each side of cushion 400 (for example for holding a left and/or a right earphone.

Various exemplary dimensions 129a-h are indicated for various optional structures in the embodiment of FIG. 4. For example the lateral width 129a of head indentation 430 may range between 170 to 190 mm and/or between 170 to 150 mm and/or between 150 to 110 mm and/or between 110 to 70 mm and/or between 190 to 230 mm.

In some embodiments, the lateral width 129b of a protrusion forming side walls may range, for example between 30 to 60 mm and/or between 10 to 30 mm.

In some embodiments, side wall 428 may be directed parallel to the sagittal plane and/or parallel to the longitudinal axis and/or sagittal axis. Alternatively or additionally, side wall 428 may be curved and/or tilted between outward laterally at an angle between 0 to 10 degrees from the sagittal axis and/or from the longitudinal axis and/or between 10 to 30 degrees from either or both axes.

In some embodiments the superior extent 129i of the raised temple region 136 may range between 80 to 100 mm and/or between 60 to 80 mm and/or between 30 to 60 mm and or greater than 100 mm.

In some embodiments the anterior breadth 129c of the temple region 136 protrusion may range for example between 85 to 105 mm and/or between 75 to 85 mm and/or between 50 to 75 mm and or greater than 105 mm.

In some embodiments the anterior breadth 129d of the lateral ends of bowed ledge 432 and/or ear space 134 protrusion may range for example between 55 to 75 mm and/or between 75 to 85 mm and/or between 50 to 75 mm and or less than 50 mm.

In some embodiments the anterior breadth 129e of the central and/or posterior portion of bowed ledge 432 may range for example between 10 to 25 mm and/or between 25 to 35 mm and/or between 35 to 55 mm and or less than 10 mm. For example, in the embodiment of cushion 400 breadths 129c-e may be defined as the anterior distance above the flat rear face 126 of head indentation 430. Optionally, for example in a case where the anterior facing rear surface of the head indentation is not flat, the breadth 129c-e may be defined as the anterior distance between the hindermost (most posterior point) on the rear face of the head indentation.

In some embodiments the lateral width 129f of neck cradle 440 may range for example between 130 to 170 mm and/or between 100 and 130 mm and/or between 70 to 100 mm and/or between 40 to 70 mm and/or between 170 to 190 mm and/or greater than 190 mm.

In some embodiments side walls may of the neck cradle may be directed along the plane of the longitudinal axis and/or the sagittal axis. Alternatively or additionally, side walls may be curved and/or tilted between outward laterally at an angle between 0 to 10 degrees from the sagittal axis and/or from the longitudinal axis and/or between 10 to 30 degrees from either or both axes.

In some embodiments the superior extent 129g of the neck cradle 440 may range between 40 to 75 mm and/or between 75 to 100 mm and/or between 20 to 40 mm and or less than 20 mm. In some embodiments the superior extent 129h of the curved portion of U-shaped ledge 432 of a transition region 438 may range between 50 to 80 mm and/or between 80 to 100 mm and/or between 20 to 50 mm and or greater than 100 mm.

In some embodiments some or all of the cushion may be made of elastic foam and/or memory foam. For example the foam may have an indentation force deflection (IFD) at 25% deflection use ranging between 12 to 18 pounds/50 insq. on 20 inches by 20 inches by 4 inches and/or ranging between 18 to 24 and/or ranging between 24 to 30 and/or ranging between 30 to 36 and/or ranging between 36 to 45 and/or greater than 45. Optionally the occipital support ledge may be stiffer than other parts of the cushion.

Figure 5:
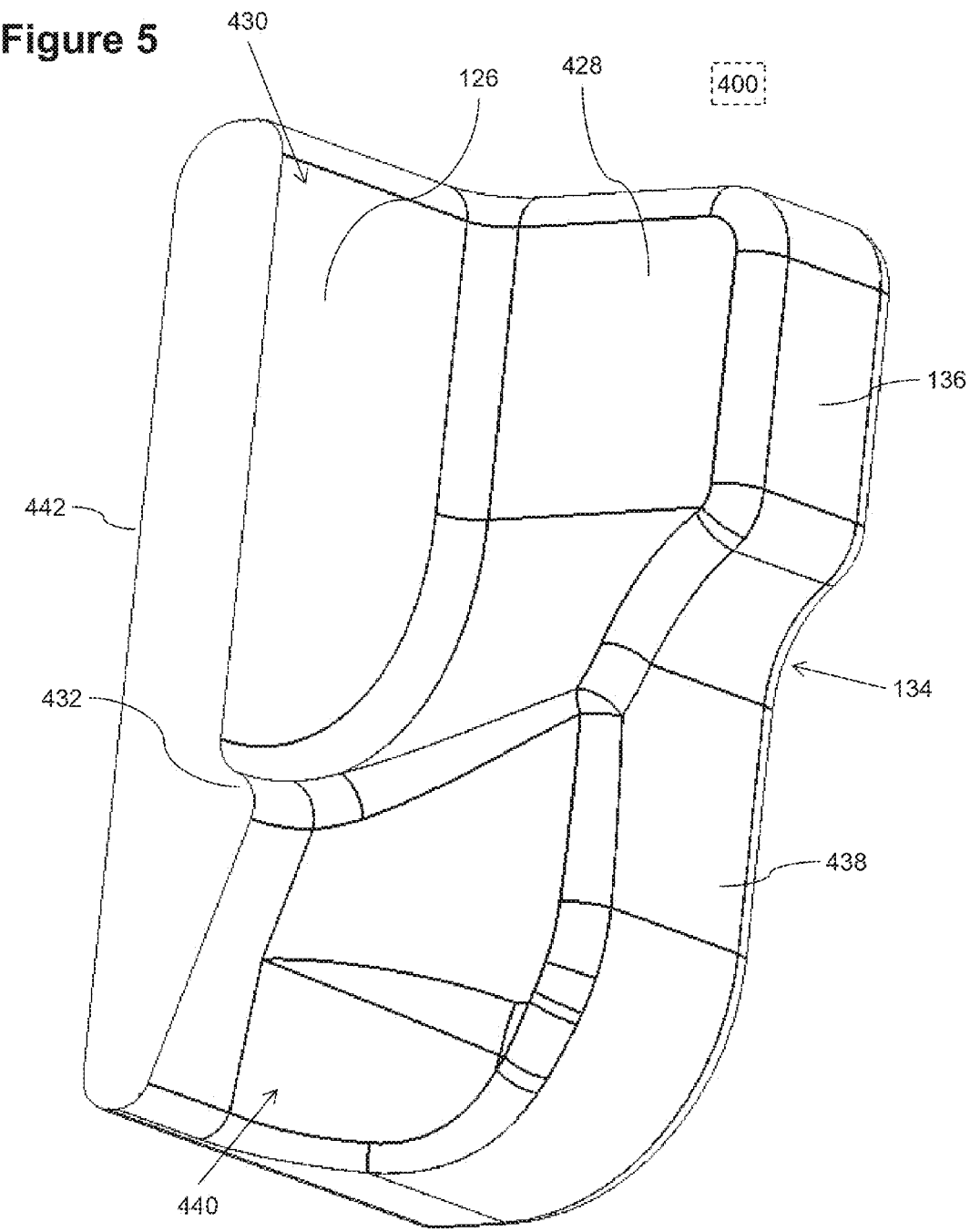
FIG. 5 is a cutaway perspective view of a cushion in accordance with an embodiment of the current invention.

FIG. 5 is cut away cross sectional view of a cushion in accordance with an alternative embodiment of the present invention. Optionally transitions are illustrated. For example the sharp ledge 432 between the deep head bottom of head indention 430 to shallow top of neck cradle 440. For example the shallow gradual deepening of neck cradle 440 is shown as it goes downward from ledge. 432.

Figure 6:
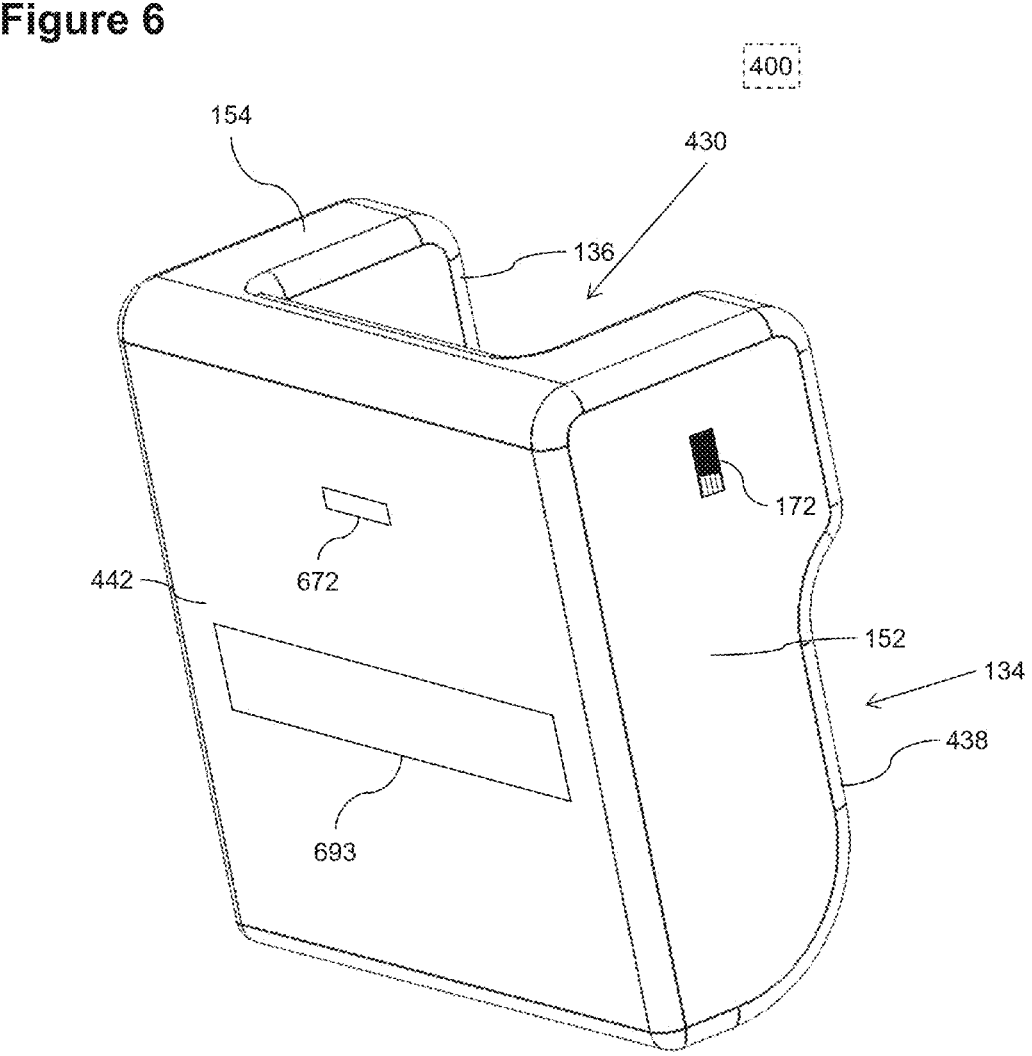
FIG. 6 is a posterior perspective view of a cushion in accordance with an embodiment of the present invention.

FIG. 6 is perspective view of a posterior side of a cushion in accordance with an alternative embodiment of the present invention. Optionally, the posterior surface 442 of the cushion includes an interface configured for being supported by a surface, for example the ground and/or a seat back. Optionally, posterior surface 442 may be flat and/or shaped and/or sized to fit a supporting surface. FIG. 6 also illustrates optional outer top wall 154 and/or outer side wall 152 of cushion 400. In some embodiments, a cushion may include a posterior pocket. Optionally cushion, 400 includes a posterior carrying handle 693. For example, handle 693 may include a strap and/or an elastic band. For example handle 693 may be used to hang cushion 400 when not in use and/or to carry cushion and/or handle 693 may be hooked over an extending handle of a dolly type suitcase for easy carrying and/or handle 693 may be used to connect cushion 442 to a surface for example by wrapping it around a seat back and/or connecting it to a seat belt. An optionally clip 672 may be used for earphone wires and the like.

FIGS. 7A-D are cut away cross sectional perspective views of cushion 400 in accordance with an embodiment of the present invention. For example, the cross section of the upper portion (e.g. temple region 136) of head indention 430 is optionally rectangular, as illustrated in FIG. 7A. For example, the cross section of the lower portion (e.g. ear space 134 region) of head indention 430 is optionally a compound rounded base slanted sided shape, as illustrated in FIG. 7B. For example, the cross section of the transition region 438 of head indention 430 and/or neck cradle 440 is optionally rounded, as illustrated in FIG. 7C. Alternatively or additionally a part and/or all of head indentation 430 may have slanted sides and/or rounded sides and/or a rounded base and/or straight sides and/or a flat base. For example, the cross section of the lower portion (e.g. ear space 134 region) of neck cradle 440 is optionally a compound rounded base slanted sided shape, as illustrated in FIG. 7D.

Exemplary Use of a Cushion

Figure 8:
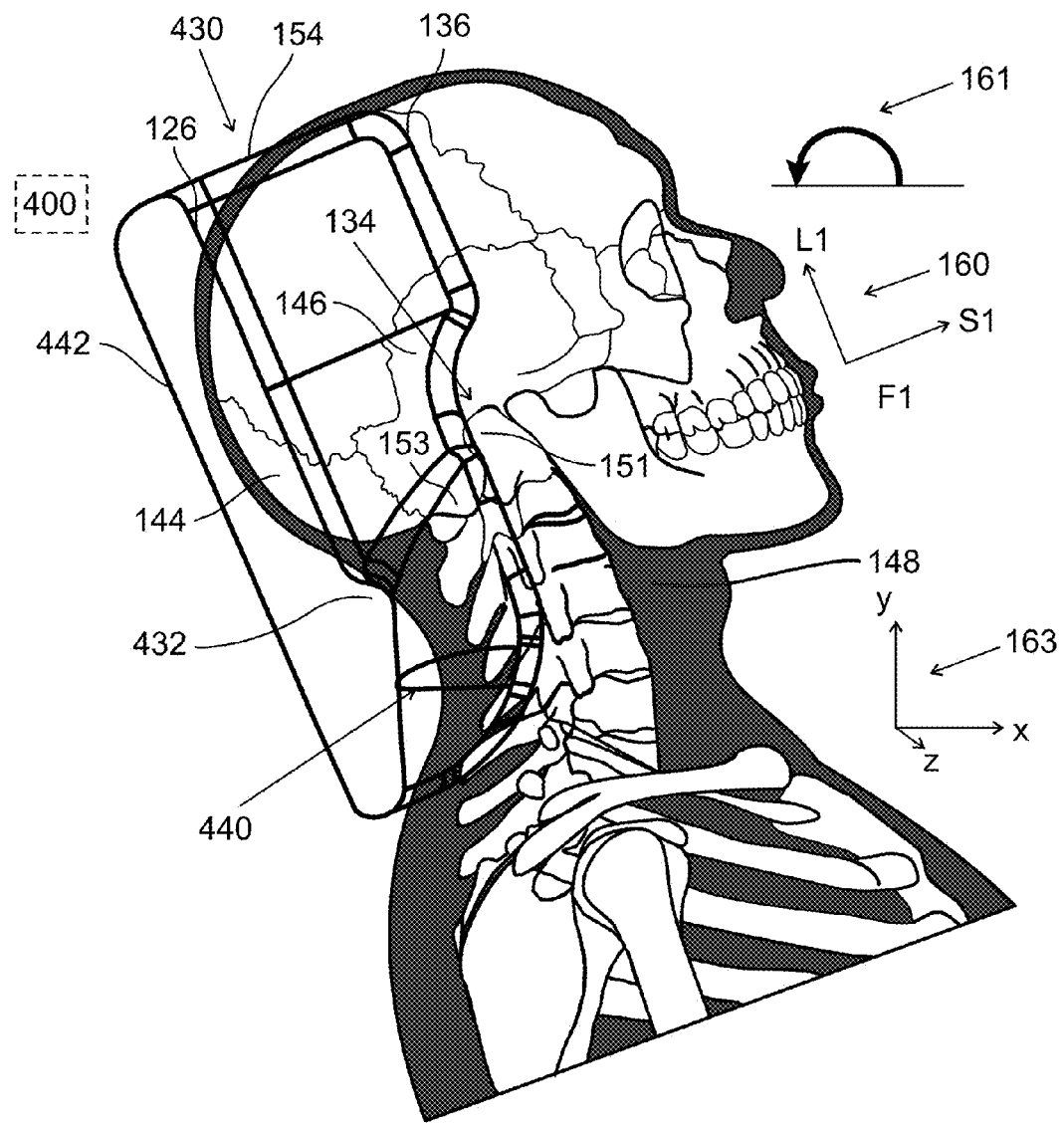
FIG. 8 is a side cutaway view of a person reclining on a cushion in accordance with an embodiment of the current invention.

FIG. 8 is a side cutaway view of a person reclining of a cushion in accordance with an embodiment of the current invention. Optionally ledge 432 is wrapped around an occipital portion of the user's head. Optionally, the inferior part and/or center of ledge 432 is providing superior directed support to the posterior occipital portion of the user's head, for example including the rear and/or bottom of occipital bone 144. The upper bowed sides of ledge 432 are shown optionally providing superior directed support to the anterior occipital portion of the user's head including, for example, the anterior sides of occipital bone 144 and/or the sides of temporal bone 146 and/or mastoid process 153. Optionally, superior directed forces on the occipital portion of the head and/or anterior directed forces on the back of the head reduce the weight on the user's neck. Optionally, the balance of forces between superior directed forces applied at posterior and/or anterior locations on the occipital portion of the user's head and/or anterior directed forces on the back of the user's head protect the user's head from rotating moments in the forward and/or backward direction. Optionally, the balance of forces between superior directed forces applied at left and/or right sides of the occipital portion of the user's head and/or between lateral directed forces applied for example at the temples and/or occipital portion of the head protect the user's head from lateral moments.

In some embodiments, the balance of forces is controlled by the stiffness of cushion 400 and/or of ledge 432. Alternatively or additionally, the balance of forces is controlled by the anterior offset between the anterior portion of ledge 432 and the center posterior portion. Alternatively or additionally, the balance of forces is controlled by the superior offset between the anterior portion of ledge 432 and the center posterior portion. Alternatively or additionally, the balance of forces is controlled by angle of ledge 432 at its center and/or at its lateral ends.

For example, the anterior offset between the anterior portion of ledge 432 and the posterior central part may include the difference between the breadth 129e of ledge 432 at its center (for example see FIG. 4) and the breadth 129d at the lateral end of ledge 432. For example the difference may between 0 to 2 cm and/or between 2 to 4 cm and/or between 4 to 6 cm and/or between 6 to 10 cm.

In some embodiments, superior offset between the anterior portion of ledge 432 and the posterior central part may include difference 129k (for example see FIG. 4), and/or range between 0 to 1 cm and/or between 1 to 4 cm and/or between 4 to 8 cm.

In some embodiments, an acoustic meatus 151 (for example an ear location) is unhindered by the sides of the cushion 400.

Figure 9A:
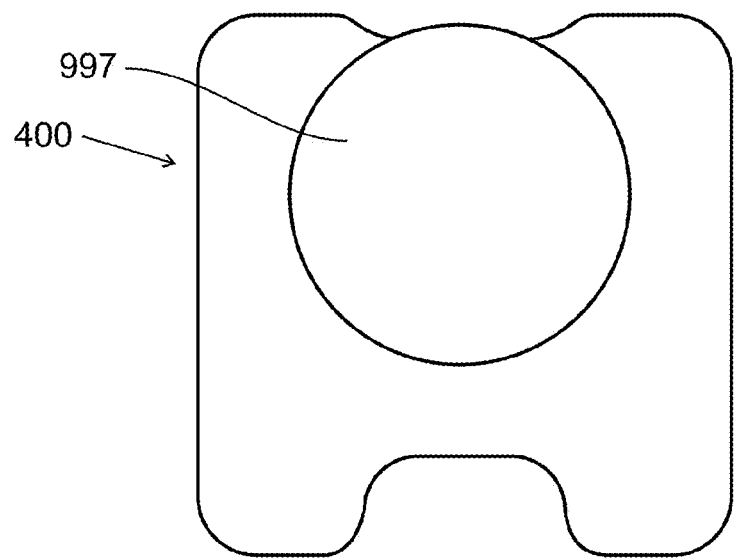
FIGS. 9A-B are perspective illustrations of a supported by a chair supporting a ball in accordance with an embodiment of the present invention.
Figure 9B:
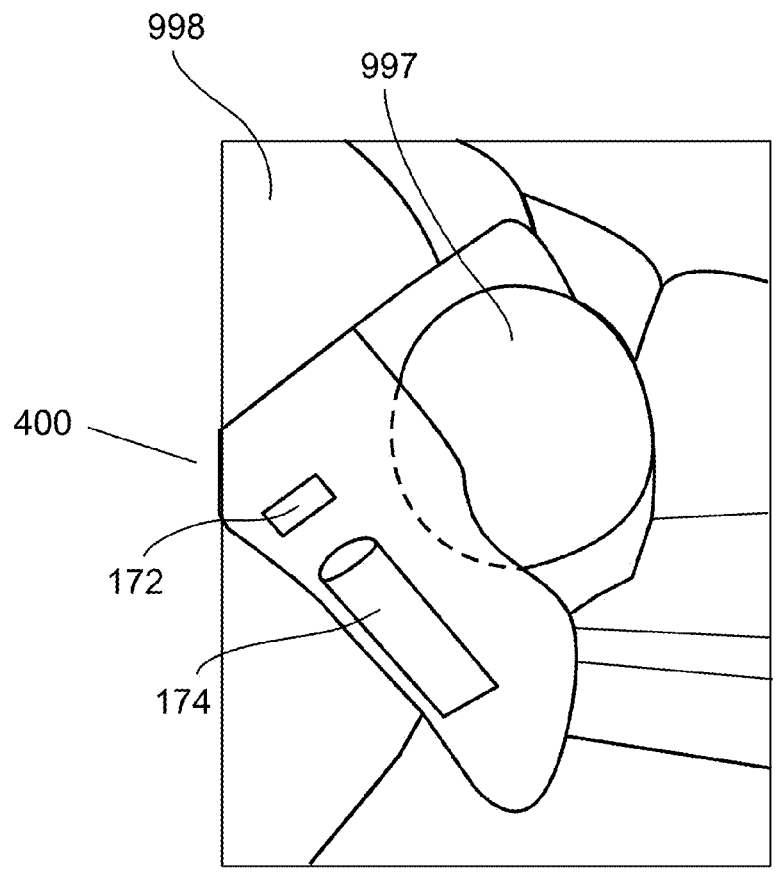

FIGS. 9A-B illustrate a soccer ball 997 sitting in cushion 400 supported by a vehicle seat 998 in accordance with an embodiment of the present invention. In some embodiments, when cushion 400 is supported at an angle ranging between 105 degrees to 115 degrees from horizontal, the head indentation may support ball 997 without falling. Such support may for example take weight and/or twisting moments of a head off a neck helping a person using pillow 400 to relax.

Further Optional Features

In some embodiments the upper surface of ledge 432 may be flat. Alternatively or additionally, the uppers surface may have a texture such a scalloped and/or wavy and/or bumpy.

In some embodiments, ledge 432 may be continuous. Alternatively or additionally, the ledge may have openings and/or breaks and/or discontinuities.

In some embodiments ledge 432 may be substantially perpendicular to the longitudinal axis. Alternatively or additionally, the ledge may be oriented at an angle ranging between 80 to 95 degrees with to the longitudinal axis and/or between 65 and 80 degrees and/or between 95 to 110 degrees and/or at an angle ranging between 50 to 65 degrees.

Alternatively or additionally, the angle between the ledge and the longitudinal axis may vary along the length of the ledge.

In some embodiments, the neck indentation of the neck cradle of the cushion may be shaped to support the back of the neck and or shoulders. Various parts may be curved and/or linear having a constant angle and/or an angle that changes over space. For example the superior side of the neck cradle at the top of the cervical spine where it meets the head may have a sharp angle with the posterior surface of the cushion, for example the angle may range between 60 to 70 degrees and/or between 40 and 60 degrees and/or between 70 and 85 degrees.

In some embodiments, on the lower side of neck cradle, for example in the region of the lower neck and shoulders (where the top of the dorsal and/or thoracic spine meet with bottom of the cervical spine) the angle may be low for example the angle between the anterior face of the neck cradle in this region and the posterior surface of the cushion may form an angle ranging between 15 to 30 degrees and/or between 5 to 15 degrees and/or between 30 to 45 degrees.

In some embodiments the cushion may be made from a soft foam material. Optionally or additionally the cushion may include an impermeable shell filled with a liquid (for example an inflatable cushion and/or a liquid filled cushion). Optionally the cushion may include a cover. For example the cover may be made of an absorbent material, for example cloth. Alternatively or additionally the cushion may be filled with particulate fill (for example Styrofoam balls and/or feathers and/or beans etc.).

In some embodiments the cushion may include a pocket. For example a pocket may be designed to hold an MP3 player and/or a pocket on the posterior side and/or the interior of the cushion may hold valuables of a user while he sleeps. In some embodiments the cushion may include a clip. For example a clip may hold earphones.

In some embodiments a cushion may include a handle for example for carrying the cushion or hanging it. Alternatively or additionally the cushion may include a retainer for example to hold the cushion in a folded configuration for easy carrying and/or storage.

In some embodiments of the present invention the head support may produce a net rearward torque on the head of a person reclining on the cushion. For example when the posterior surface of the cushion is placed on a surface a reclining at an angle ranging between 105 and 115 degrees from horizontal, a rounded object (for example a head and/or a soccer ball) placed in the head indentation of the cushion may be supported such that it does not roll forward and/or downward. For example for a right hand coordinate system if the y-axis is vertical and the x-axis is horizontal and both the positive x and y axis are pointed in the anterior direction (pointed outward from an anterior surface [e.g. pointed outward from the frontal plane]), the net torque around the z axis (parallel to the anterior surface of the cushion) may be in the positive direction.

In some embodiments the side surface of the head indentation blocks the temple of a reclining and/or supine user from lateral movement. For example, lateral movement of the temples may be blocked by a protrusion in the anterior direction projecting from the anterior facing rear face of the head indention a distance ranging for example between 7 and 8.5 cm and/or between 8.5 and 10 cm and/or greater than 10 cm.

In some embodiments the wall of the head indentation may have an ear space. For example there may be a hole and/or indentation so that the walls of the head indentation do not touch the ears of the user. Alternatively or additionally the walls of the head indentation in the vicinity of the ears may protrude less in the anterior direction than in the region of the temple. For example the walls in the vicinity of the ears may protrude from the anterior facing rear face of the head indention a distance ranging between 0 to 2 cm and/or the between 2 to 4 cm/or the between 4 to 5.5 cm and/or between 5.5 to 8.5 cm.

It is expected that during the life of a patent maturing from this application many relevant materials for cushion stuffing and/or covering will be developed and the scope of the terms covering stuffing and/or cushion is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A travel cushion comprising:
   an interface fitting to an airplane seat back to be supported thereon;
   an anterior surface having a preuse configuration including
      a head indentation having an open anterior facing rear face, side surfaces and an upwardly curved base; said upwardly curved base shaped to at least partially wrap around an occipital portion of a head of a user;
      a ledge along said curved base of said head indentation for providing superior support to said occipital portion of the head of the user, said ledge bowing upward in a superior direction and outward in an anterior direction from said open anterior facing rear face; a central portion of said ledge having an upper surface at an angle between 65° and 110° to a longitudinal axis over a breadth of at least 1 cm in the anterior direction; and
      a neck positioning cradle having an open face and a rear surface inclining toward a posterior direction from a superior end, said superior end joined to said head indentation along said ledge.

2. The travel cushion of claim 1, wherein the cushion is elastic, spontaneously returning to the preuse configuration in the absence of an external stress.

3. The travel cushion of claim 1, wherein said side surfaces of said head indentation include a temple prop, obstructing lateral movement of a temple of a user.

4. The travel cushion of claim 1, wherein said side surfaces of said head indentation include an ear opening.

5. The travel cushion of claim 1, wherein said side surfaces of said head indentation protrude in an anterior direction to a non-uniform extent with respect to a hindermost point of said open anterior facing rear face of said head indentation; said side surfaces including an ear opening section located between 2 and 8.5 cm superior to an inferior point on said ledge and said ear opening section extending less than 84 mm anterior to said hindermost point of said open anterior facing rear face of said head indentation; said side surfaces including a temple prop section located superior to said ear opening; said temple prop section protruding further in the anterior direction than said ear opening.

6. The cushion of claim 1, wherein said neck positioning cradle is trapezoidal.

7. The cushion of claim 1, wherein said upper surface of said ledge is at an angle between 80° and 95° to said longitudinal axis.

8. The cushion of claim 1, wherein said breadth of said ledge is between 1.0 and 3.0 cm.

9. The cushion of claim 1, wherein said breadth of said ledge varies along the horizontal axis of the cushion, said breadth increasing towards the sides of the cushion and decreasing towards the center of the cushion.

10. The travel cushion of claim 1, further comprising:
    a cushion behind said open anterior facing rear face of said head indentation.

11. A travel cushion comprising:
    an interface fitting to an airplane seat back to be supported thereon;
    an anterior surface having a preuse configuration including
       a head indentation having an open anterior facing rear face, side surfaces and a upwardly curved base, said curved base shaped to at least partially wrap around an occipital portion of a head of a user;
       a ledge along said curved base of said head indentation for providing superior support to said occipital portion of the head of the user , said ledge bowing upward in a superior direction and outward in an anterior direction from said open anterior facing rear face;
       a neck positioning cradle having and open face, and a rear surface inclining toward a posterior direction from a superior end, said superior end joined to said head indentation along said ledge;
       wherein said side surfaces of said head indentation protrude to a non-uniform extent from a hindermost point of said open anterior facing rear face of said head indentation including an ear opening section located between 2 and 8.5 cm superior to an inferior point on said ledge and protruding less than 84 mm anterior to said hindermost point of said open anterior facing rear face of said head indentation and a temple prop section located superior to said ear opening and protruding further in the anterior direction than said ear opening.

12. A travel cushion comprising:
    a head support having a rear face, side surfaces, and an upwardly concave base;
    a neck cradle having and open face, and a rear face inclining toward a posterior direction from a superior end joined to said upwardly concave base; and
    an occipital support ledge along a junction between said neck cradle and said head support, said occipital support ledge separating a shallow superior section of said neck cradle from a deeper base of said head support, and said occipital support ledge bowing upward and outward to be concave in the superior and anterior directions, said ledge having an upper surface providing superior directed support to occipital and temporal bones of a head resting on the travel cushion.

13. The cushion of claim 12, wherein said neck cradle includes a bulge supporting and fitting cervical and thoracic portions of a spine.

14. The cushion of claim 13, wherein said neck cradle includes rounded side walls.

15. The cushion of claim 14, wherein said bulge has a superior surface in a cervical region at an angle between 60 to 70 degrees from a posterior surface of the cushion and an anterior face at a thoracic region at between 15 to 45 degrees from the posterior surface.

16. The cushion of claim 12, wherein at least four edges of said cushion are rounded.

17. The travel cushion of claim 12, wherein said upper surface of said occipital support ledge is at an angle between 80° and 95° to a longitudinal axis.

18. The travel cushion of claim 12, wherein said occipital support ledge has a breadth of between 1.0 and 3.0 cm.

19. The travel cushion of claim 12, further comprising:
an interface sized and shaped for placement of an airplane seat and configured to support a weight of a head resting on the cushion when said seat is at an angle of between 105 and 115 degrees from a horizontal x-axis.

20. The travel cushion of claim 12, wherein said neck cradle is trapezoidal.

21. The travel cushion of claim 12, wherein said occipital support ledge supports a temporal bone.

22. The travel cushion of claim 12, wherein said occipital support ledge has an upper surface at an angle between 65° and 110° to a longitudinal axis over a breadth of at least 1 cm in the anterior direction.

23. The cushion of claim 12, wherein in use, the form of the travel cushion is substantially fixed.

\* \* \* \* \*